United States Patent
Calvet et al.

(10) Patent No.: US 8,083,144 B2
(45) Date of Patent: Dec. 27, 2011

(54) DEVICE FOR IDENTIFICATION OF A GAS CARTRIDGE FOR A GAS-POWERED FASTENING DEVICE WHERE THE APPARATUS COMPRISES THE DEVICE AND THE CARTRIDGE FOR THE APPARATUS

(75) Inventors: Pierrick Calvet, Saint Nazaire les Eymes (FR); Nicolas Guihard, Caluire et Cuire (FR); Florent La Bella, Romans sur Isere (FR)

(73) Assignee: Societe de Prospection et d'Inventions Techniques Spit, Bourg les Valence (FR)

( * ) Notice: Subject to any disclaimer, the term of this patent is extended or adjusted under 35 U.S.C. 154(b) by 209 days.

(21) Appl. No.: 11/994,243

(22) PCT Filed: Jul. 1, 2006

(86) PCT No.: PCT/IB2006/001823
§ 371 (c)(1),
(2), (4) Date: Dec. 28, 2007

(87) PCT Pub. No.: WO2007/004029
PCT Pub. Date: Jan. 11, 2007

(65) Prior Publication Data
US 2008/0217408 A1  Sep. 11, 2008

(30) Foreign Application Priority Data
Jul. 1, 2005 (FR) ..................................... 05 07041

(51) Int. Cl.
*G06K 7/08* (2006.01)
(52) U.S. Cl. ........................................ 235/451; 235/492
(58) Field of Classification Search .................. 235/492
See application file for complete search history.

(56) References Cited

U.S. PATENT DOCUMENTS

| | | | | |
|---|---|---|---|---|
| 3,920,149 A | * | 11/1975 | Fortino et al. | 222/1 |
| 5,295,611 A | * | 3/1994 | Simard | 222/129.3 |
| 5,587,578 A | | 12/1996 | Serra | |
| 5,603,430 A | * | 2/1997 | Loehrke et al. | 222/1 |
| 6,094,138 A | * | 7/2000 | Eberhardt et al. | 340/572.1 |
| 2002/0053735 A1 | * | 5/2002 | Neuhaus et al. | 257/728 |
| 2003/0183226 A1 | * | 10/2003 | Brand et al. | 128/200.23 |

FOREIGN PATENT DOCUMENTS
FR  2723654 A1  2/1996
FR  2833685 A1  6/2003

OTHER PUBLICATIONS
ISR for PCT/IB2006/001823 mailed Oct. 27, 2006.
* cited by examiner

*Primary Examiner* — Daniel Hess
*Assistant Examiner* — Michael Andler
(74) *Attorney, Agent, or Firm* — Lowe, Hauptman, Ham & Berner, LLP

(57) ABSTRACT

A device for identifying a gas cartridge connectable to a gas-powered fastening apparatus via a valve includes a solenoid for both opening/closing the valve and for defining an antenna for wireless communication with an electronic label that is located on the cartridge and identifies the cartridge.

27 Claims, 1 Drawing Sheet

DEVICE FOR IDENTIFICATION OF A GAS CARTRIDGE FOR A GAS-POWERED FASTENING DEVICE WHERE THE APPARATUS COMPRISES THE DEVICE AND THE CARTRIDGE FOR THE APPARATUS

RELATED APPLICATIONS

The present application is based on International Application Number PCT/IB2006/001823 field Jul. 1, 2006, and claims priority from French Application Number 0507041 filed Jul. 1, 2005, the disclosures of which are hereby incorporated by reference herein in their entirety.

TECHNICAL FIELD

The invention concerns gas-powered fastener apparatuses, which draw their energy, for combustion and propulsion of a drive piston from a fastening element, from a gas cartridge that is connected to a transmission and filling element of the combustion chamber in these devices, an element which generally consists of a solenoid valve or an electromagnetically controlled valve. As gas-powered fastening devices, we can consider, for example, nail guns, hammers and other stapling devices.

BACKGROUND

These devices comprise a housing for accepting a cartridge held in this housing through means that are integral to the devices, such as, for example, a flap, a hood, or a yoke slid into a groove of the ejection nozzle of the cartridge.

When in operation, the cartridge and the solenoid valve are connected to each other in a generally watertight manner through a connecting adaptor that is integral to the cartridge and which is hooked onto an intermediate admission nozzle that is integral to the solenoid valve.

Replacing a cartridge in a device once it has been emptied of its gas after use can present problems for usage, because when the cartridge is being changed, the gas, which can vary from one cartridge to another, not only by manufacturer but also by manufacturing location could require different setting levels for the device.

SUMMARY

The applicant has therefore sought a means of identifying the cartridge at the time it is loaded into the device's acceptance housing while modifying this housing as little as possible, and this is how his invention is being proposed.

The invention involves, first of all, a device for identifying the gas cartridge for gas-powered fastening devices comprising a combustion chamber, a device for transmission of gas from the cartridge in said chamber, which comprises a valve that is controlled by a solenoid, where the device consists of a means of reading an electronic identification label on the cartridge, with an antenna for broadcasting the data from the label, a means of reading consisting of a receiving antenna for said data constituted by said solenoid.

The purpose of the solenoid is to both control the valve and receive signals from the electronic label.

Preferably, the electronic label should consist of a transponder with the means of reading arranged so as to activate said transponder.

In this way, the cartridge type can be automatically transmitted to the device simply by bringing the label near the means of reading it.

Even more preferably, the electronic label emits an identifying signal indicating the quality of the gas in the cartridge. Adjustments to the device resulting from a change in the nature of the gas can thus be carried out simultaneously.

The invention also concerns a gas-powered fastening device comprising a device for transmission of gas from a gas cartridge in the combustion chamber, where the device comprises a valve that is controlled by a solenoid, and a housing for loading the cartridge, which is a device that is unique in that it comprises the device from the invention, in this case a means of reading an electronic identification label on a cartridge comprising a reception antenna for data from the label constituted by the solenoid.

The means of reading are preferably arranged so as to read an electronic label as the cartridge is being introduced into its housing. The housing does not need to be modified and will accept a cartridge with or without a label.

Finally, the invention involves a gas cartridge for a gas-powered fastening device, distinguished by the fact that it is equipped with an electronic identification label that is equipped with an antenna and a rewritable memory. Preferably, the electronic label is located on the cartridge adapter and comprises a radio antenna screen printed onto this adapter.

BRIEF DESCRIPTION OF THE DRAWINGS

The invention will be better understood in the light of the following description of the identification device on the gas cartridge mounted on a gas-powered fastening device, and of the electronic label according to a preferred manner of embodiment of the invention, and of the accompanying drawing, in which.

DETAILED DESCRIPTION OF THE DRAWINGS

Figure 1:
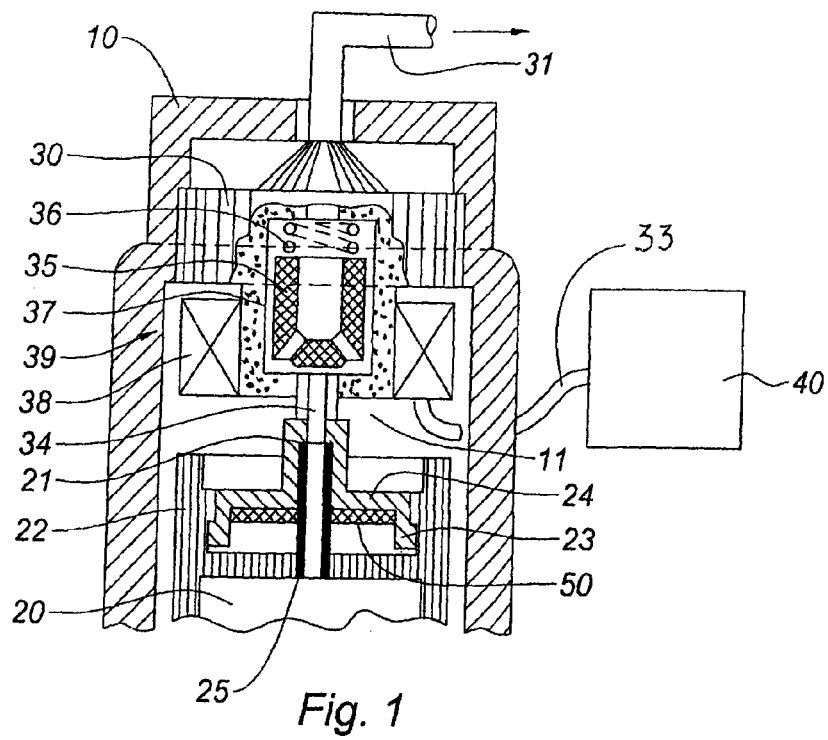
FIG. 1 is a section sketch of the head of the cartridge hooked onto the gas transmission element of the gas-powered fastening device and FIG. 2 is a block diagram of the function of the cartridge's identification device for the gas-powered fastening device and the electronic label according to the invention.

In reference to FIG. 1, a gas-powered fastening device (partially shown) comprises an enclosure 10 for a housing 11 that houses a gas cartridge 20 introduced by its head 22 and pushed until it is in a position to hook onto a device 30 for transmitting gas to the device through the intermediary of a tube nozzle 31.

In order to avoid unnecessarily complicating the drawing, the means of hooking is not shown.

Transmission device 30 comprises a valve 39 that typically consists of a cylinder 37 in which a operates valve 35 of magnetic material, a return spring 36 for valve 35 and a solenoid 38 that acts upon valve 35 in order to allow admission of the gas through an intermediate nozzle 34 in cylinder 37.

Head 22 encloses an adapter 21 for connecting nozzle 25 in cartridge 20 to the intermediate admission nozzle 34. Legs 23 that extend a base 24 in adapter 21 keep it in head 22 with clips.

In order to control valve 35, solenoid 38 accepts an electrical current through an electrical connection 33 that is controlled by an electrical module 40 that will be described in further detail later.

Adapter 21 comprises an electronic label 50 and the gas transmission device 30 comprises a means, described hereinafter, of reading label 50.

Figure 2:
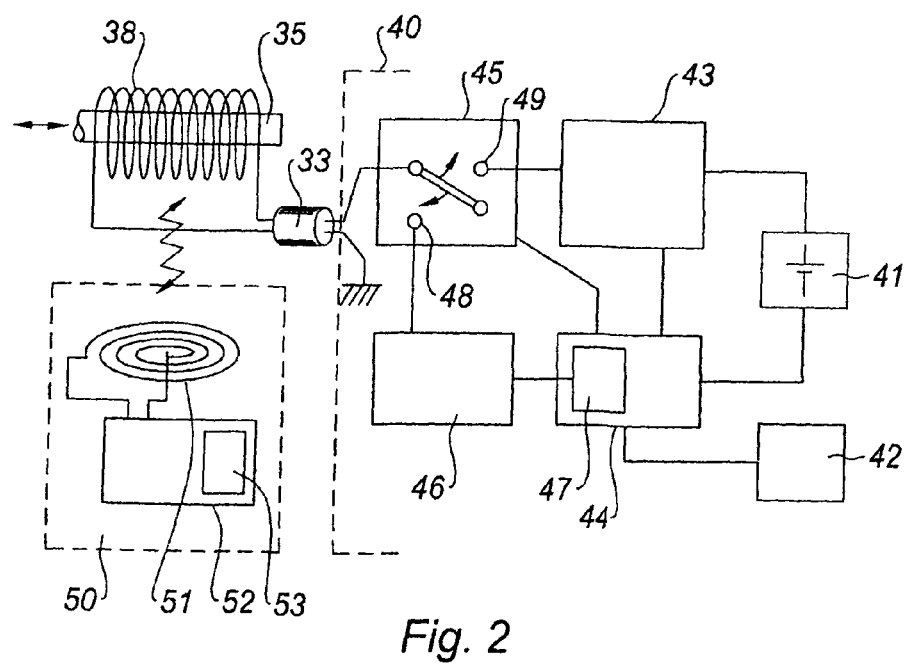

The label could, for example, be a simple bar code and the reader a bar code reader, but here we prefer, in reference to FIG. 2, a real transponder 50, similar to that in automobile vehicle keys which are read in the same way, an antenna 51 and an electronic microcircuit 52 that includes a memory 53 for identifying the gas contained in cartridge 20, and which is rewritable, so as to be able to alter it after a first reading through the means of reading indicated above.

Transponder 50 can be affixed to the external surface of cartridge 20, or onto adapter 21, for example, as shown in FIG. 1, under base 24, or even integrated into the adapter if the material that comprises it so allows.

Antenna 51 can then be a spiral antenna attached through serigraphy to the internal surface of base 24 of the adaptor.

The means of reading transponder 50 are integrated into the electronic module 40 and valve 39. They consist of:
An antenna located in housing 11 of enclosure 10, in proximity to label 50, for example, on spool 38. Here it is the solenoid 38 itself of valve 39 which is used as an antenna,
In module 40, a transceiver 46, which is controlled by a pilot 47 in a microprocessor 44 which is the control microprocessor for the device itself, and connected to antenna 38 through supply cable 33 for solenoid 38 and a switch 45 that has two positions 48 and 49 which are controlled by microprocessor 44.

Transceiver 46 can use solenoid 38 as a radio antenna and function at 125 kilohertz according to European standards for regulating frequency bands that are usable in this context, because the characteristics of solenoid 38 are compatible with it.

Microprocessor 44 controls valve 39 with an electric supply module 43 of the latter likewise through a cord 33 and switch 45.

The electric module 40 is supplied with power by a battery 41 and monitors and if necessary modifies the usage parameters of the device recorded in a memory 42 in order to consequently adjust them as a function of the nature of the gas in cartridge 20.

When a cartridge 20 is introduced into housing 11, microprocessor 44 detects its presence, either upon indication of the user through a user interface (not shown), or automatically through a contact located in the housing (not shown either), positions switch 45 on position 48 that connects solenoid 38 to the transceiver 46 and activates this latter with its pilot 47. Detecting the cartridge can also occur with each firing, which is easier, or with each firing sequence.

In position 48, solenoid 38 serves to emit and receive signals to or from transponder 50.

Transceiver 46 in turn activates transponder 50 and the latter sends back an identification signal that is immediately transmitted to microprocessor 44.

Microprocessor 44 can then adjust the device automatically in memory 42, if necessary, then control the alteration of memory 53 through the same path, and finally position switch 45 onto position 49 in order to connect solenoid 38 to module 43.

In this position 49, solenoid 38 serves to command valve 39.

In order to do this, gas cartridge 20 must consist of an electronic identification label comprising transponder 50 and a memory 53 that can be written over by module 40.

The invention claimed is:

1. A device for identifying a gas cartridge connectable to a gas-powered fastening apparatus via a valve, said device comprising:
a solenoid for opening or closing the valve to control transfer of gas from the cartridge to the fastening apparatus; and
an electronic module for wirelessly reading an electronic label that is located on the cartridge and identifies the cartridge,
wherein said electronic module is electrically connected to said solenoid for wirelessly communicating, via said solenoid being an antenna, with the electronic label;
wherein said electronic module comprises:
a switch having first and second positions; and
a transceiver;
wherein
when said switch is in the first position, said transceiver is electrically connected, by said switch, to said solenoid for wirelessly receiving data, via said solenoid, from the electronic label; and
when said switch is in the second position, said transceiver is electrically disconnected from said solenoid which is now electrically connectable, by said switch, to a power supply for receiving power from said power supply to close or open the valve.

2. The device of claim 1, wherein said electronic module further comprises:
a processor electrically coupled to said transceiver and to said switch for controlling said switch to
(a) be in the first position when a presence of the cartridge is detected, and
(b) switch from the first position to the second position after the data from the electronic label has been wirelessly received by said processor via said transceiver.

3. The device of claim 2, wherein said electronic module further comprises:
a memory storing therein operational parameters of the gas-powered fastening apparatus;
wherein said memory is coupled to and updatable by said processor for adjusting the stored parameters based on the data received from the electronic label on the cartridge.

4. The device of claim 1, wherein said electronic module further comprises
a pilot coupled to the transceiver for wirelessly activating, via the solenoid, a transponder of the electronic label.

5. The device of claim 4, wherein
said solenoid is configured as an antenna having a frequency of about 125 kHz for wireless communication with the transponder of the electronic label over said frequency.

6. The device of claim 1, wherein
when said switch is in the first position, said transceiver, said switch and said solenoid are electrically connected in series with the switch being positioned between the transceiver and the solenoid; and
when said switch is in the second position, said transceiver is electrically disconnected, by said switch, from said solenoid which is now electrically connected in series to said switch and said power supply with the switch being positioned between the power supply and the solenoid.

7. The device of claim 1, wherein said solenoid comprises a plurality of loops which are
(i) electrically connected to the transceiver, when the switch is in the first position, to define an antenna for wirelessly receiving data from the electronic label, and
(ii) electrically disconnected from the transceiver and electrically connected to the power supply, when the switch is in the first position, for receiving power from said power supply to close or open the valve.

8. A gas-powered fastening apparatus, comprising:
a housing for receiving a gas cartridge;
a valve in said housing and connectable to an outlet nozzle of the cartridge when the cartridge is received in said housing, said valve comprising magnetic material;

a solenoid for electromagnetically closing or opening the valve to control transfer of gas from the cartridge to said fastening apparatus; and an electronic module for wirelessly reading an electronic label that is located on the cartridge and identifies the cartridge, wherein said electronic module is electrically connected to said solenoid for wirelessly communicating, via said solenoid being an antenna, with the electronic label.

9. The apparatus of claim 8, further comprising
a power supply for powering the solenoid to electromagnetically close or open the valve.

10. The apparatus of claim 9, wherein said electronic module comprises:
a switch having first and second positions; and
a transceiver;
wherein
when said switch is in the first position, said transceiver is electrically connected, by said switch, to said solenoid for wirelessly receiving data, via said solenoid, from the electronic label; and
when said switch is in the second position, said transceiver is electrically disconnected from said solenoid which is now electrically connected, by said switch, to said power supply for receiving power from said power supply to close or open the valve.

11. The apparatus of claim 10, wherein said electronic module further comprises:
a processor electrically coupled to said transceiver and to said switch for controlling said switch to
(a) be in the first position when a presence of the cartridge is detected, and
(b) switch from the first position to the second position after the data from the electronic label has been wirelessly received by said processor via said transceiver.

12. The apparatus of claim 11, wherein said electronic module further comprises:
a memory storing therein operational parameters of said gas-powered fastening apparatus;
wherein said memory is coupled to and updatable by said processor for adjusting the stored parameters based on the data received from the electronic label on the cartridge.

13. The apparatus of claim 10, wherein said electronic module further comprises
a pilot coupled to the transceiver for wirelessly activating, via the solenoid, a transponder of the electronic label.

14. The apparatus of claim 13, wherein
said solenoid is configured as an antenna having a frequency of about 125 kHz for wireless communication with the transponder of the electronic label over said frequency.

15. The apparatus of claim 8, further comprising:
a drive piston.

16. The apparatus of claim 15, further comprising:
a combustion chamber connectable to the gas cartridge via said valve for receiving gas from the cartridge via said valve, and for causing propulsion of the drive piston by combustion of said gas in said combustion chamber.

17. The apparatus of claim 8, being a nail gun or a hammer.

18. The apparatus of claim 8, being a stapling device.

19. In combination, a gas-powered fastening apparatus and a gas cartridge, wherein
said gas cartridge comprises
an outlet nozzle; and
an electronic label that is located on the cartridge and identifies the cartridge, said electronic label comprising a transponder for wireless communication with said apparatus;

said apparatus comprises:
a housing for receiving said gas cartridge;
a valve in said housing and connectable to said outlet nozzle of the cartridge when the cartridge is received in said housing, said valve comprising magnetic material;
a solenoid;
a power supply electrically connectable to said solenoid for powering said solenoid to electromagnetically close or open said valve to control transfer of gas from said cartridge to said fastening apparatus; and
a transceiver electrically connectable to said solenoid, said solenoid defining an antenna for wirelessly communicating said transceiver of said apparatus with said transponder of said cartridge for reading data in the electronic label to identify the gas in the cartridge.

20. The combination of claim 19, wherein said cartridge further comprises a rewritable memory storing said data.

21. The combination of claim 20, wherein said rewritable memory is wirelessly updatable, via said transponder, said solenoid and said transceiver, by said apparatus.

22. The combination of claim 19, wherein said cartridge further comprises a printed antenna which defines, with said solenoid, a wireless connection between said transceiver of said apparatus and said transponder of said cartridge.

23. The combination of claim 22, wherein said printed antenna and said solenoid are wirelessly communicable over a frequency of about 125 kHz.

24. The combination of claim 19, wherein
said apparatus further comprises a switch having first and second positions;
when said switch is in the first position, said transceiver is electrically connected, by said switch, to said solenoid for wirelessly receiving data, via said solenoid functioning as an antenna, from said electronic label; and
when said switch is in the second position, said transceiver is electrically disconnected from said solenoid which is now electrically connected, by said switch, to said power supply and functions as an actuator for closing or opening said valve.

25. The combination of claim 24, wherein said apparatus further comprises a processor electrically coupled to said transceiver and to said switch for controlling said switch to
(a) be in the first position when the cartridge being introduced into the housing is detected, and
(b) switch from the first position to the second position after the data from the electronic label has been wirelessly received by said processor via said solenoid and said transceiver.

26. The combination of claim 19, wherein said apparatus is a nail gun, a hammer, or a stapling device.

27. The combination of claim 19, wherein said apparatus further comprises:
a drive piston; and
a combustion chamber connectable to the gas cartridge via said valve for receiving gas from the cartridge via said valve, and for generating energy for propulsion of the drive piston from the gas received in said combustion chamber.

* * * * *